United States Patent
Baghdasarian

(10) Patent No.: US 11,649,075 B2
(45) Date of Patent: May 16, 2023

(54) MULTI-SATELLITE DEPLOYABLE DISPENSER

(71) Applicant: Maxar Space LLC, Palo Alto, CA (US)

(72) Inventor: Varouj Baghdasarian, Cupertino, CA (US)

(73) Assignee: Maxar Space LLC, Palo Alto, CA (US)

( * ) Notice: Subject to any disclaimer, the term of this patent is extended or adjusted under 35 U.S.C. 154(b) by 0 days.

(21) Appl. No.: 17/410,702

(22) Filed: Aug. 24, 2021

(65) Prior Publication Data

US 2023/0062667 A1 Mar. 2, 2023

(51) Int. Cl.
 *B64G 1/64* (2006.01)
(52) U.S. Cl.
 CPC ........ *B64G 1/641* (2013.01); *B64G 2001/643* (2013.01)
(58) Field of Classification Search
 CPC .... B64G 1/641; B64G 2001/643; B64G 1/10; B64G 1/645; B64G 1/22; B64G 1/64
 See application file for complete search history.

(56) References Cited

U.S. PATENT DOCUMENTS

| 4,342,262 A | * | 8/1982 | Romer | F42B 12/58 |
| | | | | 102/393 |
| 5,411,226 A | * | 5/1995 | Jones | B64G 1/641 |
| | | | | 244/173.3 |
| 5,613,653 A | * | 3/1997 | Bombled | B64G 1/641 |
| | | | | 244/173.1 |

(Continued)

FOREIGN PATENT DOCUMENTS

| CN | 111332496 A | 6/2020 |
| EP | 3385173 A1 | 10/2018 |

(Continued)

OTHER PUBLICATIONS

International Search Report & The Written Opinion of the International Searching Authority dated Nov. 9, 2022, International Patent Application No. PCT/US2022/039924.

(Continued)

*Primary Examiner* — Medhat Badawi
*Assistant Examiner* — Vicente Rodriguez
(74) *Attorney, Agent, or Firm* — Vierra Magen Marcus LLP

(57) ABSTRACT

Technology is disclosed herein for a spacecraft launch restraint and dispensing structure. The dispensing structure has a number of trusses and a central structure. When the trusses are in a support position, each spacecraft may be supported at one point by the central structure and at two points by one or more of the trusses. Therefore, each spacecraft may be supported at three points, thereby providing a stable support for each spacecraft. The spacecrafts do not touch each other and do not bear the weight of other spacecrafts. In a deployment position, the trusses extend away from the satellites and do not support the satellites; however, the satellites initially remain connected to the central structure. In the deployment position, the trusses are out of an ejection path such that the satellites can be ejected in a desired sequence from the central structure.

20 Claims, 10 Drawing Sheets

(56) References Cited

U.S. PATENT DOCUMENTS

| | | | |
|---|---|---|---|
| 6,135,391 A * | 10/2000 | Van Woerkom | B64G 1/641 |
| | | | 102/377 |
| 6,138,951 A * | 10/2000 | Budris | B64G 1/645 |
| | | | 102/393 |
| 8,915,472 B2 | 12/2014 | Aston et al. | |
| 9,027,889 B2 | 5/2015 | Aston et al. | |
| 9,463,882 B1 * | 10/2016 | Field | B64G 1/645 |
| 9,718,566 B2 | 8/2017 | Field et al. | |
| 2008/0078886 A1 | 4/2008 | Foster et al. | |
| 2015/0028159 A1 | 1/2015 | Vichnin et al. | |
| 2017/0096240 A1 * | 4/2017 | Cook | B64G 1/64 |
| 2018/0290771 A1 * | 10/2018 | Chiang | B64G 1/645 |
| 2021/0229839 A1 * | 7/2021 | Texier | B64G 1/002 |

FOREIGN PATENT DOCUMENTS

| | | |
|---|---|---|
| EP | 3782914 A1 | 2/2021 |
| RU | 2725824 C1 | 7/2020 |

OTHER PUBLICATIONS

English Abstract of RU Publication No. RU2725824 published Jul. 6, 2020.
English Abstract of CN Publication No. CN111332496 published Jun. 26, 2020.

* cited by examiner

MULTI-SATELLITE DEPLOYABLE DISPENSER

BACKGROUND

The cost to launch spacecrafts such as satellites into orbit is extraordinarily expensive. The cost per satellite can be reduced by launching multiple satellites with one launch vehicle. However, additional mass adds considerably to the fuel cost. Thus, it is desirable to reduce the mass of the payload of the launch vehicle.

A satellite launch restraint and dispensing structure may be used to facilitate the launching of multiple satellites. The satellite launch restraint and dispensing structure typically connects to the launch vehicle. Once in orbit, the satellites may be dispensed from the restraint and dispensing structure. The satellites are sometimes oriented during launch one above another with respect to the gravitational force of the earth. Hence, the weight of the upper satellites needs to be supported either by satellites below and/or by the satellite launch restraint and dispensing structure. Because the satellite weight is equal to the mass times the gravitational acceleration, during launch the acceleration of the launch vehicle results a very high weight of the satellites.

Therefore, the satellite launch restraint and dispensing structure should have adequate structural rigidity to support the satellites during launch. Also, during launch there are typically strong vibrations. Thus, it is challenging to design a satellite launch restraint and dispensing structure that has adequate structural rigidity and is low in mass.

Moreover, the satellite launch restraint and dispensing structure needs to be able to deploy the satellites once the launch vehicle is in orbit. Some conventional dispensing mechanisms are complex and add to the mass of the structure.

DETAILED DESCRIPTION

Technology is disclosed herein for supporting spacecrafts during launch and dispensing the spacecrafts into orbit. An embodiment includes a spacecraft launch restraint and dispensing structure that supports each spacecraft at three locations on each respective spacecraft. The spacecrafts do not touch each other and do not bear the weight of other spacecrafts. Therefore, the spacecrafts can be made from a lightweight material, which saves considerable launch cost by reducing fuel consumption. In an embodiment, the spacecraft launch restraint and dispensing structure has a number of trusses and a central structure, all of which may be connected to a launch adaptor. In an embodiment, each spacecraft is supported at an interior point by the central structure, at a first exterior point by one truss and at a second exterior point by another truss. Therefore, each spacecraft may be supported at three points, thereby providing a stable support for each spacecraft.

The trusses have a support position and a deployment position. The spacecrafts may be grouped in multiple levels around the central structure, with the trusses surrounding the spacecrafts when in the support position. In the deployment position, the trusses extend away from the satellites and do not support the satellites. However, the satellites remain connected to the central structure when the trusses are initially moved to the deployment position. In the deployment position, the trusses are out of an ejection path such that the satellites can be ejected from the central structure. The satellites are deployed in a desired sequence by ejecting the satellites from the central structure.

Figure 1:
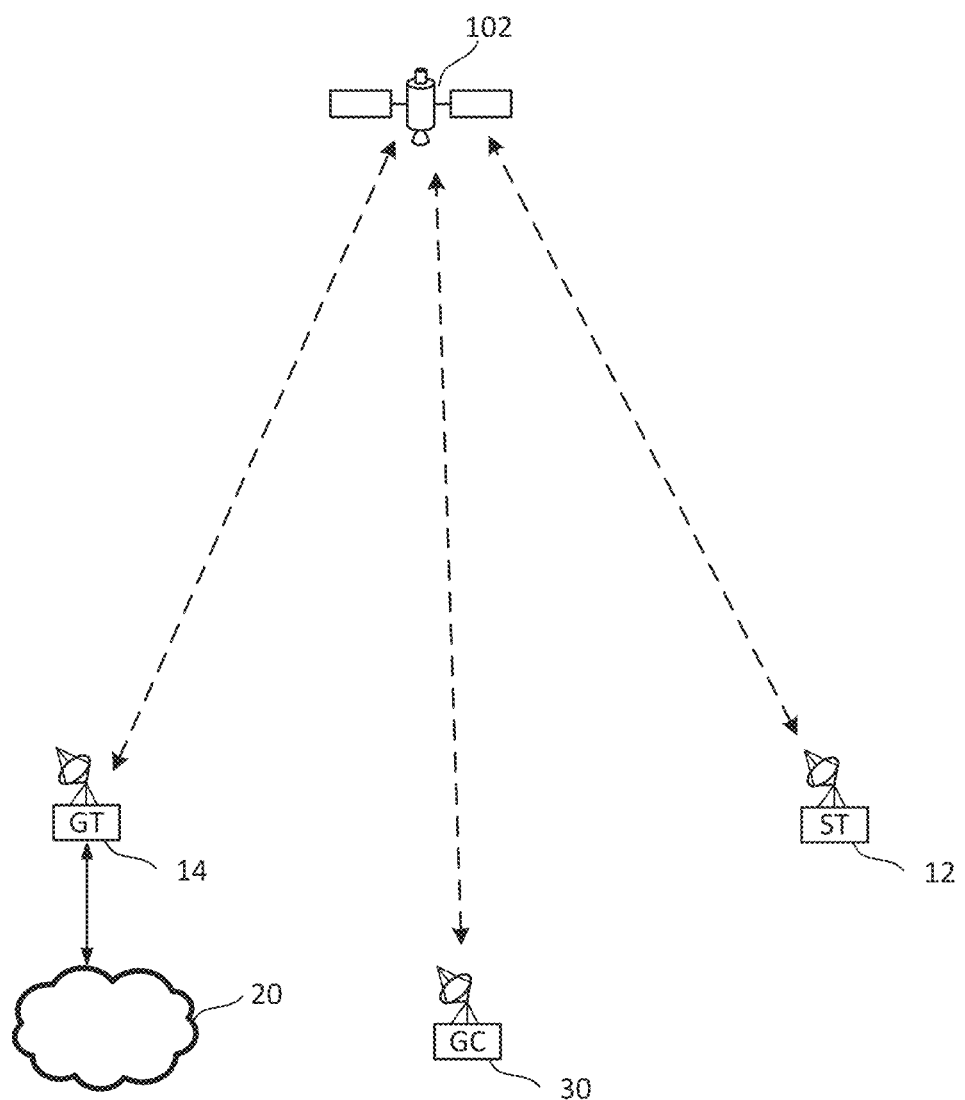
FIG. 1 is a block diagram of a spacecraft system.

FIG. 1 is a block diagram of a spacecraft system. The system of FIG. 1 includes spacecraft 102, subscriber terminal 12, gateway 14, and ground control terminal 30. Subscriber terminal 12, gateway 14, and ground control terminal 30 are examples of ground terminals. In one embodiment, spacecraft 102 is a satellite; however, spacecraft 102 can be other types of spacecrafts (e.g., shuttle, space station, interplanet traveling craft, rocket, etc.). Spacecraft 102 may be located, for example, at a geostationary or non-geostationary orbital location. Spacecraft 102 can also be a Low Earth Orbit satellite. Technology disclosed herein may be used for launching and dispensing (or deploying) the spacecraft 102 into orbit.

Spacecraft 102 is communicatively coupled by at least one wireless feeder link to at least one gateway terminal 12 and by at least one wireless user link to a plurality of subscriber terminals (e.g., subscriber terminal 12) via an antenna system. Gateway terminal 14 is connected to the Internet 20. The system allows spacecraft 102 to provide internet connectivity to a plurality of subscriber terminals (e.g., subscriber terminal 12) via gateway 14. Ground control terminal 30 is used to monitor and control operations of spacecraft 102. Spacecraft can vary greatly in size, structure, usage, and power requirements. In some embodiments, the spacecraft 102 is not used as a communication satellite. In some embodiments, the spacecraft 102 has other payloads such as for an optical satellite.

Figure 2:
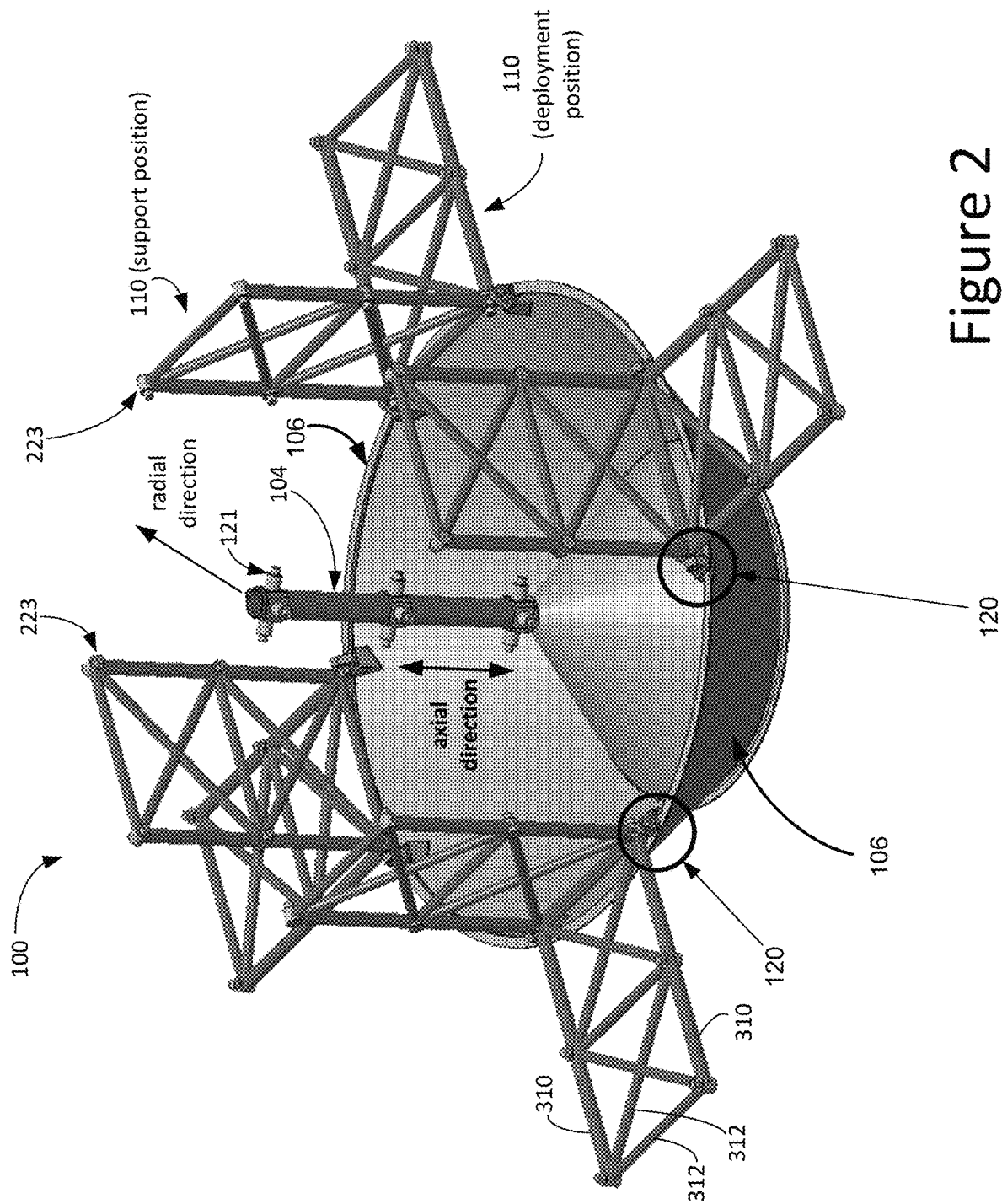
FIG. 2 is a perspective diagram of one embodiment of a satellite launch restraint and dispensing structure.

FIG. 2 is a perspective diagram of one embodiment of a spacecraft launch restraint and dispensing structure 100. For brevity the spacecraft launch restraint and dispensing structure 100 may be referred to herein as a dispensing structure. The dispensing structure 100 may be used to provide structural support to spacecrafts and to dispense the spacecrafts into orbit. Providing structural support to the satellites means that the dispensing structure 100 bears weight of the spacecrafts during launch, which allows the spacecrafts to be formed from lightweight material since the spacecrafts do not need to bear the weight of other spacecrafts. The spacecrafts are not depicted in FIG. 2. In an embodiment, the spacecrafts are satellites. The dispensing structure 100 is lightweight. The dispensing structure 100 is able to support and deploy the spacecrafts using relatively few mechanical pieces, which reduces mass thereby saving on launch fuel cost.

The dispensing structure 100 has a number of trusses 110, which are each connected to a launch adaptor 106. The trusses 110 have a support position (also referred to as stowed position) and a deployment position, with each position depicted in FIG. 2. In the support position, the trusses 110 support the satellites. In an embodiment, each satellite is supported at a first exterior point on the satellite by one truss and at a second exterior point on the satellite by another truss. This provides a very stable support and provides excellent structural rigidity. In addition, collectively the trusses 110 surround the satellites in the support position. In the deployment position, the trusses 110 extend away from the stacks of spacecrafts to allow space crafts in to be released (or deployed) in the radial direction. In the deployment position, the trusses 110 do not support the satellites. The hinge 120 allows the trusses 110 to move from the support position to the deployment position.

In the embodiment depicted in FIG. 2, each truss 110 is a planar truss having two members 310 and a number of nodes 312. In an embodiment, the members 310 are beams. Each of the nodes 312 connects to each of the two members 310. Planar trusses are structurally rigid and lightweight. However, the trusses 110 are not required to be planar trusses. For example, the trusses could alternatively be space trusses in which the members and nodes extend in three-dimensions. Also, the configuration of the nodes 312 to the trusses 110 depicted in FIG. 2 are one example configuration; however, it will be understood that the nodes 312 of the trusses can have a wide range of configurations. The trusses 110 may be formed from a lightweight material such as aluminum, titanium, or graphite.

There are a number of truss tie-down mechanisms 223 attached to the trusses 110. In the example of FIG. 2, each truss 110 has six truss tie-down mechanisms 223. Each truss tie-down mechanism 223 may have an actuator and a truss tie-down. The truss tie-down may include a rod or bolt (and nut), which connects to a spacecraft to hold the spacecraft to the truss 110. The actuator may be an electromechanical device that is able to release the spacecraft by, for example, breaking the truss tie-down. The electro-mechanical device may be commanded by a signal from, for example, a micro-processor or the like. The signal may be provided by a wire that runs through a member 310. In an embodiment, the truss tie-down mechanism 223 is a low-shock release device, such that the release does not damage electronics in the satellites 102. As one example, the truss tie-down may be a Frangibolt® and the actuator may be a shape memory actuator used to break the Frangibolt®. However, the truss tie-down mechanism 223 is not required to use either a Frangibolt® or a shape memory actuator.

The dispensing structure 100 has a central structure 104, which is connected to the launch adaptor 106. There are a number of central tie-down mechanisms 121 connected to the central structure 104. Each central tie-down mechanism 121 may have an actuator and a central tie-down. The central tie-down may include a rod or bolt (and nut), which connects to a spacecraft to hold the spacecraft to the central structure 104. The actuator may be an electromechanical device that is able to release the spacecraft by, for example, breaking the central tie-down. The electro-mechanical device may be commanded by a signal from, for example, a micro-processor or the like. The signal may be provided by a wire that runs through the central structure 104. In an embodiment, the central tie-down mechanism 121 is a low-shock release device, such that the release does not damage electronics in the satellites 102. In some embodiments, a single central tie-down mechanism 121 may be used to release two spacecrafts simultaneously. As one example, the central tie-down rod 128 may be a Frangibolt® and the actuator may be a shape memory actuator used to break the Frangibolt®. However, the central tie-down mechanism 121 is not required to use either a Frangibolt® or a shape memory actuator.

In an embodiment, each spacecraft will have three points of contact with the dispensing structure 100 (the spacecrafts are not depicted in FIG. 2). In an embodiment, each spacecraft is connected by way of a central tie-down mechanism 121 to the central structure 104. In an embodiment, each spacecraft is connected by two separate truss tie-down mechanisms 223 to two different trusses. In some embodiments, the spacecrafts are arranged as a number of stacks with each spacecraft connected by two separate truss tie-down mechanisms 223 to two different trusses. In some embodiments, the spacecrafts at one level are rotated 45 degrees relative to the spacecrafts at an adjacent level, which will result in the spacecrafts at one level each being connected to two different trusses and the spacecrafts at the adjacent level each being connected to a single (but different) truss.

The launch adaptor 106 is configured to be connected to a launch vehicle, such as a rocket. In general, the launch adaptor 106 is used to help carry the load from the dispensing structure 100 to the launch vehicle. The launch adaptor 106 may be formed from a lightweight material such as aluminum, titanium, or graphite. In the example of FIG. 2, the launch adaptor 106 has a cone to which the central structure 104 is attached, and an inverted cone to which the trusses 110 are attached. The launch adaptor 106 may have a wide variety of shapes. Therefore, the shape of the launch adaptor 106 in FIG. 2 is an example to which the launch adaptor 106 is not limited.

Thus, the spacecrafts will be grouped around the central structure 104. When in the holding position, the trusses 110 will surround the spacecrafts. When in the deployment position, the trusses 110 will be out of an ejection path in order to allow the spacecraft to be ejected. However, prior to ejection the spacecraft will still be connected to the central structure 104.

FIG. 2 depicts nine central tie-down mechanisms 121, each of which can be used to hold a spacecraft. There may be additional central tie-down mechanisms 121 on the back side of the central structure 104; however, those central tie-down mechanisms are not depicted in FIG. 2. Thus, the dispensing structure 100 depicted in FIG. 2 may be used to hold 12 spacecrafts. The central tie-down mechanisms 121 are depicted as residing at three different levels, which provides for three levels of spacecrafts. The dispensing structure 100 may be used for more or fewer than three levels of spacecrafts, in which case there would be more or fewer than three levels of central tie-down mechanisms 121.

FIG. 2 depicts an example having four trusses 110, which may be used to hold four spacecrafts at each of a number of levels of spacecrafts. In general, there are two or more trusses 110 in the dispensing structure 100. In some embodiments, the number of trusses 110 is equal to the number of spacecrafts in each level. The dispensing structure 100 may be used for more or fewer than four satellites at each level, in which case there would be more or fewer than four trusses 110.

In the embodiment depicted in FIG. 2, the central structure 104 is a structural element that provides structural support for the satellites. For example, the central structure 104 could be formed from aluminum, titanium or graphite. In one embodiment, the central structure 104 is shaped as a hollow post. In one embodiment, the central structure 104 is shaped as truss. In one embodiment, this central truss is a space truss in which the members and nodes extend in three-dimensions. For example, the central truss could have four members and a number of nodes. Each member may be a beam that connects to the launch adaptor and extends in the axial direction. Each node may connect to two of the members.

Herein, the term "apparatus" as used herein may refer to, but is not limited to, any combination of the dispensing structure 100 with or without the launch adaptor 106, the dispensing structure 100 with or without satellites 102, the dispensing structure 100 with or without a controller (e.g., micro-processor) to control the dispensing structure 100.

Figure 3A:
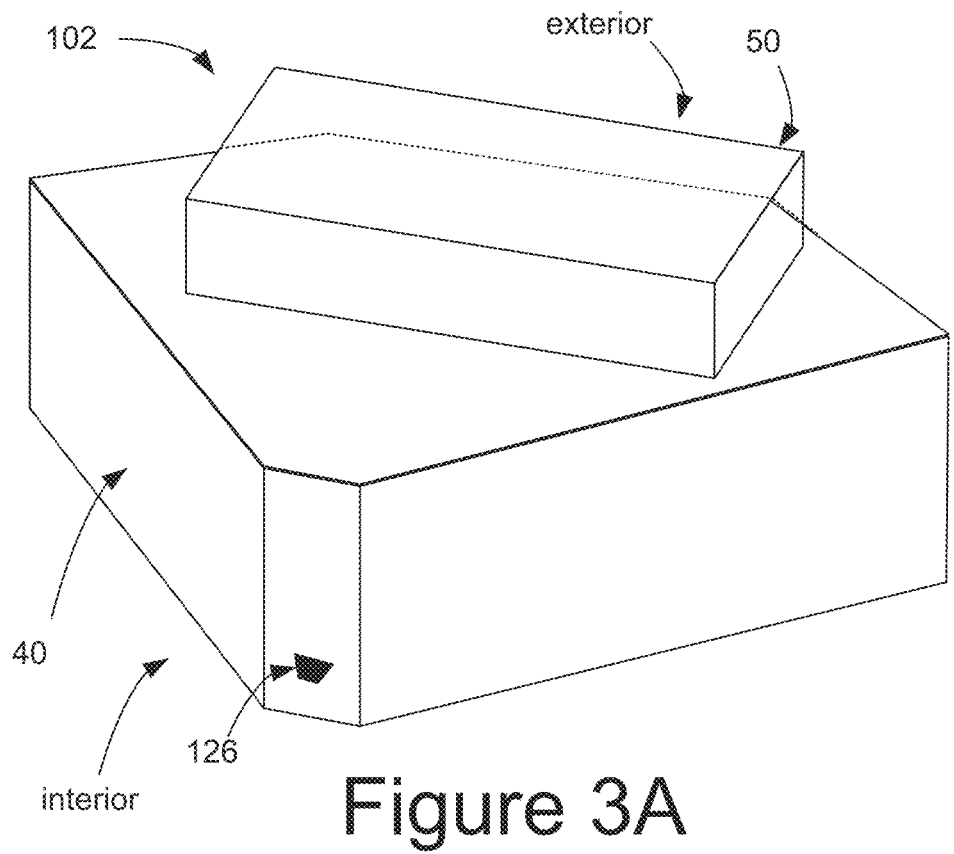
FIGS. 3A and 3B are diagram of one embodiment of a spacecraft.
Figure 3B:
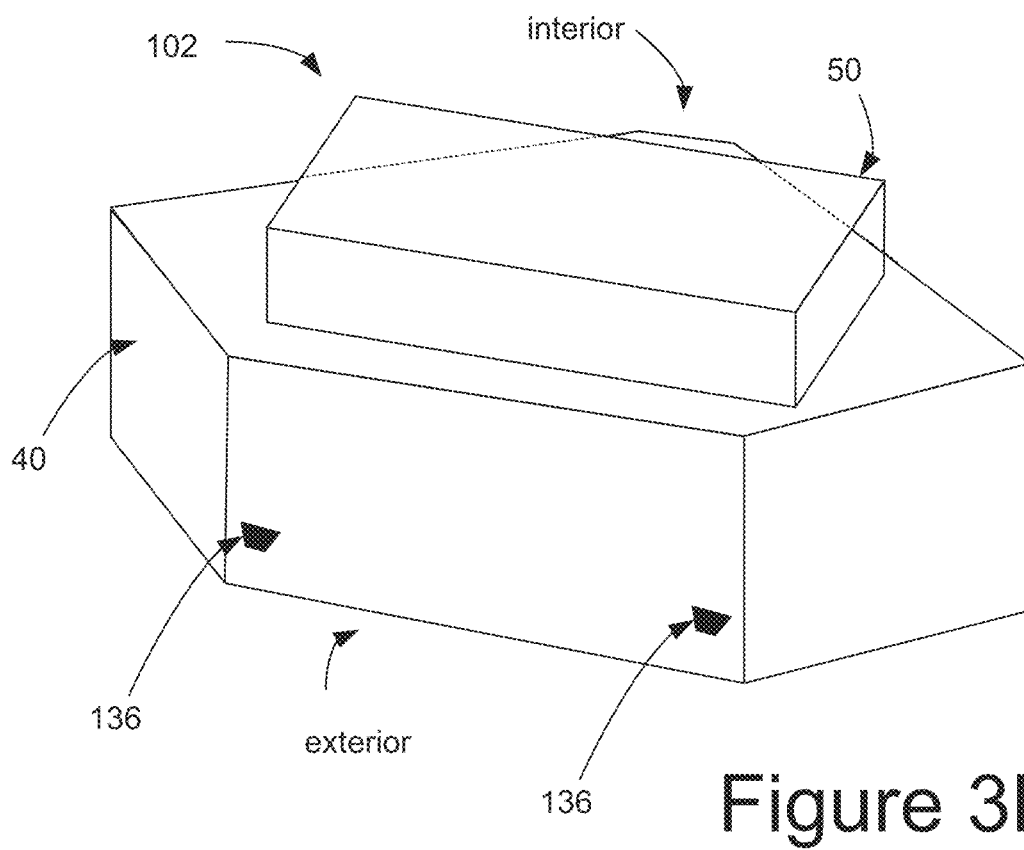

FIG. 3A and FIG. 3B are perspective views of one embodiment of a spacecraft 102. The dispensing structure 100 of FIG. 2 may be used to support and dispense a number of such spacecrafts. The spacecraft 102 may be a satellite. The spacecraft 102 has a body 40 and a payload 50. FIGS. 3A and 3B points to what is referred to as an interior and an exterior. The interior refers to the side of the spacecraft that is adjacent to the central structure 104. The exterior refers to the side of the spacecraft that is adjacent to the trusses 110.

The body 40 houses electronics. As noted, the spacecraft 102 may be used in dispensing structure 100, in which some of the spacecrafts are below others during launch. However, the lower spacecrafts 102 are not required to bear the weight of upper spacecrafts 102, thereby allowing the body 40 to be formed from lighter materials than if the body 40 needed to support the weight of another spacecraft 102. Rather, the dispensing structure 100 bears the weight of the spacecrafts 102. The body 40 may be made of a lightweight material such as aluminum, titanium, graphite, etc.

The payload 50 may house solar cells, antennas, earth-observing equipment, remote-sensors, etc. The spacecraft 102 may have many different shapes. Therefore, the shape depicted in FIGS. 3A and 3B is one example. Note that in some of the drawings described below, the payload 50 is not depicted in order to better illustrate features of embodiments disclosed herein.

In the embodiment depicted in FIGS. 3A and 3B, the spacecraft 102 has a nose cone 126 and two truss cones 136. In some embodiments, the central structure 104 has cups, each of which will receive a nose cone 126. In some embodiments, the trusses 110 have cups, each of which will receive a truss cone 136. Thus, the nose cone 126 and truss cones 136 facilitate connection to an embodiment of the dispensing structure 100. One of the truss cones 136 may connect to one truss 110, and the other truss cone 136 may connect to a different truss 110.

Figure 4:
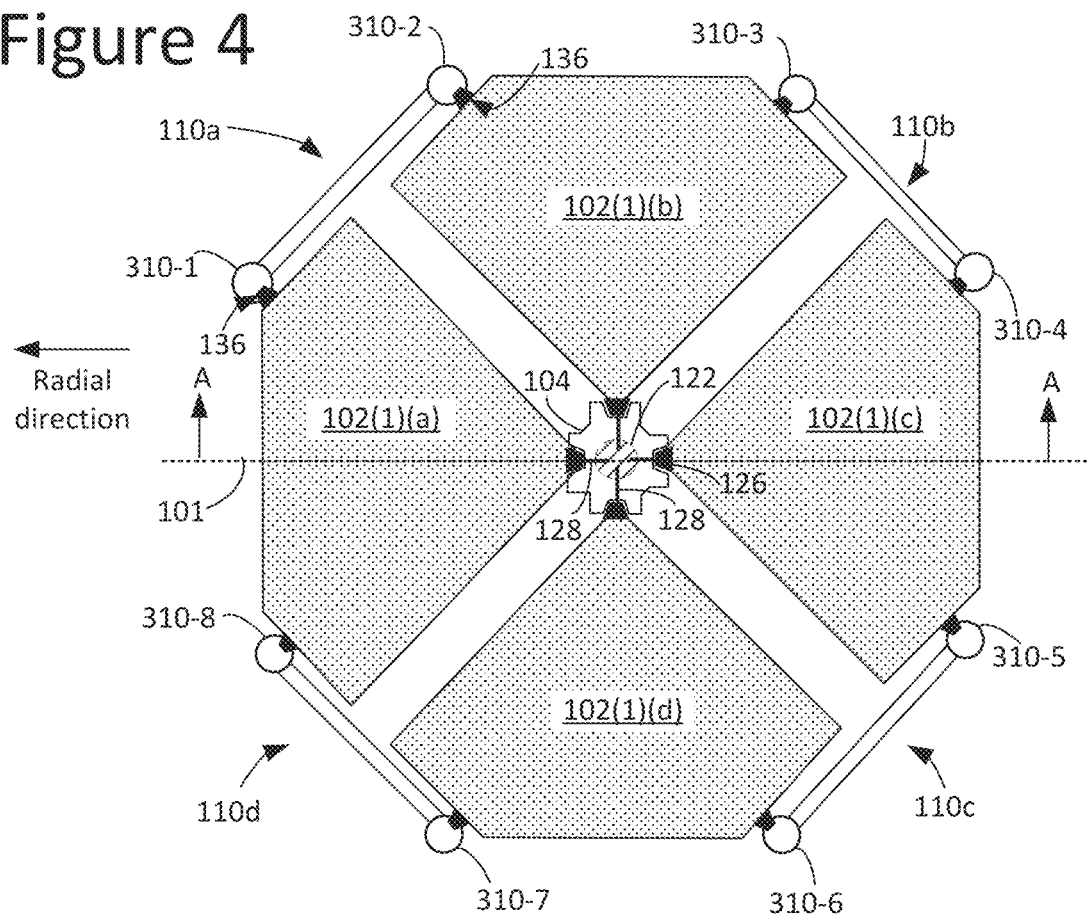
FIG. 4 is a top view of an embodiment of the spacecraft launch restraint and dispensing structure.
Figure 5:
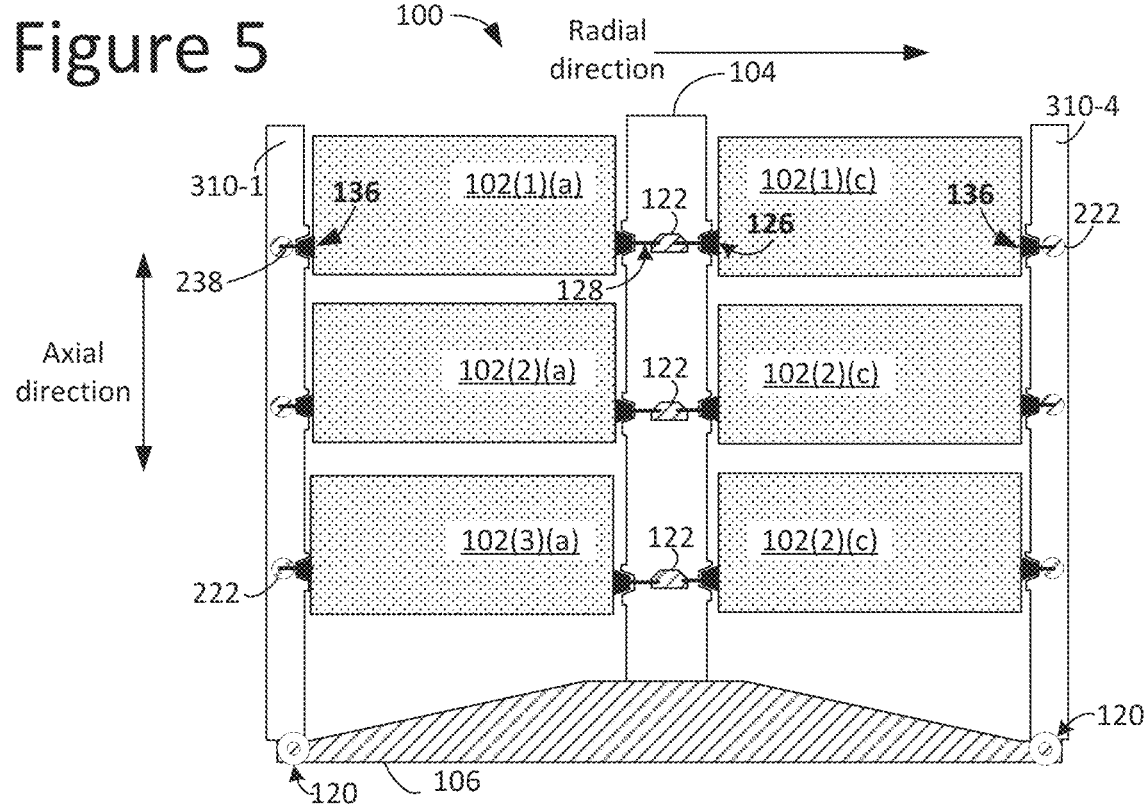
FIG. 5 is a cross-sectional diagram of one embodiment of the spacecraft launch restraint and dispensing structure, and is consistent with the structure depicted in FIG. 4.

FIG. 4 is a top view of an embodiment of the spacecraft launch restraint and dispensing structure 100, which supports several satellites 102. The top view of FIG. 4 shows four satellites 102(1)(a), 102(1)(b), 102(1)(c), and 102(1)(d) on the top level of a group of satellites. The reference numeral 102 will be used herein to refer to a satellite in general, without reference to a specific satellite. FIG. 5 is a cross-sectional diagram of one embodiment of the spacecraft launch restraint and dispensing structure 100, and is consistent with the structure depicted in FIG. 4. FIG. 5 shows a view from along line 101 in FIG. 4, looking in the direction of arrows labeled A. FIG. 5 shows two stacks of satellites, each having three satellites 102. Specifically, FIG. 5 shows a first stack having satellites 102(1)(a), 102(2)(a), and 102(3)(a). FIG. 5 shows a second stack having satellites 102(1)(c), 102(2)(c), and 102(3)(c). The configuration depicted in FIGS. 4 and 5 has four stacks of satellites; however, the two other stacks of satellites are not depicted in FIG. 5.

In an embodiment, the dispensing structure 100 allows for a stacked configuration of satellites. A stacked configuration of satellites means that one satellite is stacked above another, although the satellites do not touch one another due to the dispensing structure 100 supporting the launch load. The top view of FIG. 4 shows four satellites 102(1)(a), 102(1)(b), 102(1)(c), and 102(1)(d) on the top level. The middle level and the lower level may also have four satellites. In the example of FIGS. 4 and 5, there are four stacks of satellites, with each stack having three satellites. In general, there are two or more satellites 102 per level. Thus, in general, there are two or more stacks of satellites.

The dispensing structure 100 has four trusses 110a, 110b, 110c, 110d. The reference numeral 110 will be used herein to refer to a truss in general, without reference to a specific truss. Each truss 110 supports a first satellite 102 at one exterior point and a second satellite 102 at one exterior point, in this example. Each truss 110 has two members 310 (truss 110a has members 310-1 and 310-2; truss 110b has members 310-3 and 310-4; truss 110c has members 310-5 and 310-6; and truss 110d has members 310-7 and 310-8). Members 310-1 and 310-4 can be seen in FIG. 5.

Figure 9:
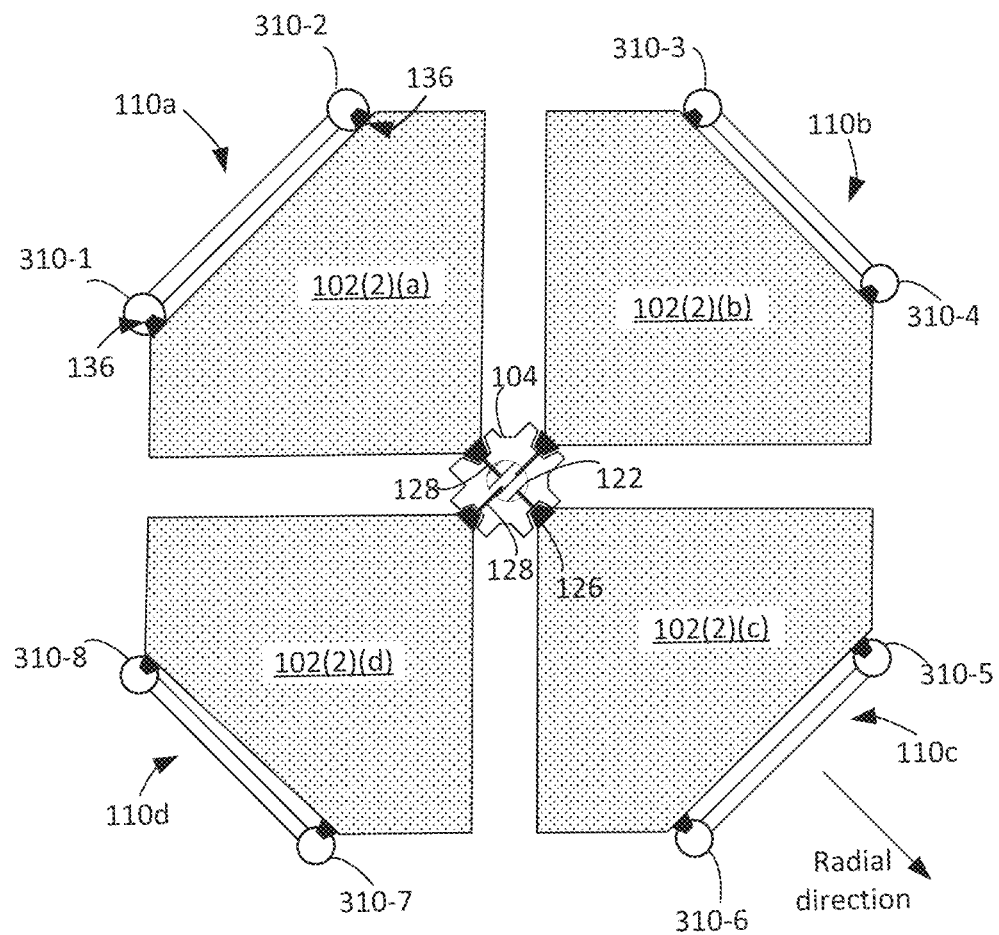
FIG. 9 is a view of an embodiment of the spacecraft launch restraint and dispensing structure.

In some embodiments, the satellites 102 at each level will be oriented as depicted in FIG. 4, with each satellite connected to two different trusses. However, in some embodiments the satellites at one level are rotated 45 degrees with respect to an adjacent level, which results in each satellite connected to a single truss at that rotated level. In such a rotated embodiment, the connections between the satellites 102 and the trusses 110 will be different than depicted in FIG. 4. FIG. 9, to be discussed below, depicts an embodiment of such a 45 degree rotated level.

Referring to FIG. 5, the trusses 110 connect to the launch adaptor 106 at a hinge 120. The hinges 120 allows the trusses 110 to move from the support position (depicted in FIGS. 4 and 5) to the deployment position (depicted in FIGS. 7 and 8). In an embodiment, the trusses 110 are formed from a metal, such as steel or titanium.

The central structure 104 connects to the launch adaptor 106. The satellites 102 are held to the central structure 104 by central tie-down rods 128 (which may be referred to as "central tie-downs"). FIG. 4 depicts four central tie-down rods 128 at the top level. The middle and lower levels may also each have four central tie-down rods 128. Each central tie-down rod 128 may hold one satellite 102 to the central structure 104. The central tie-down rods 128 may hold the satellites to the central structure 104 while the trusses 110 are in the deployment position when the satellites are ready to be dispensed. In an embodiment, a central tie-down rod 128 is bolted to a satellite 102. In some embodiments, a single central tie-down rod 128 may be used to hold down two of the satellites 102. For example, a single central tie-down rod 128 could be used to hold satellites 102(1)(a) and 102(1)(c). Likewise, a single central tie-down rod 128 could be used to hold satellites 102(1)(b) and 102(1)(d).

A central tie-down release mechanism 122 (also referred to as a "central tie-down actuator") controls the ejection of satellites 102 in the radial direction. The central tie-down release mechanism 122 may be a low-shock release device, such that the release does not damage electronics in the satellites 102. The central tie-down release mechanism 122 may include one or more electromechanical devices that are capable of releasing one or more satellites. As one example, a central tie-down rod 128 may be a Frangibolt® and the central tie-down release mechanism 122 may contain one or more shape memory actuators used to break the Frangibolts®. However, the central tie-down release mechanism 122 is not required to use either a Frangibolt® or a shape memory actuator. Together, the central tie-down release mechanism 122 and the four central tie-down rods 128 form an embodiment of the central tie-down mechanisms at one level (see FIG. 2, 121).

Figure 6A:
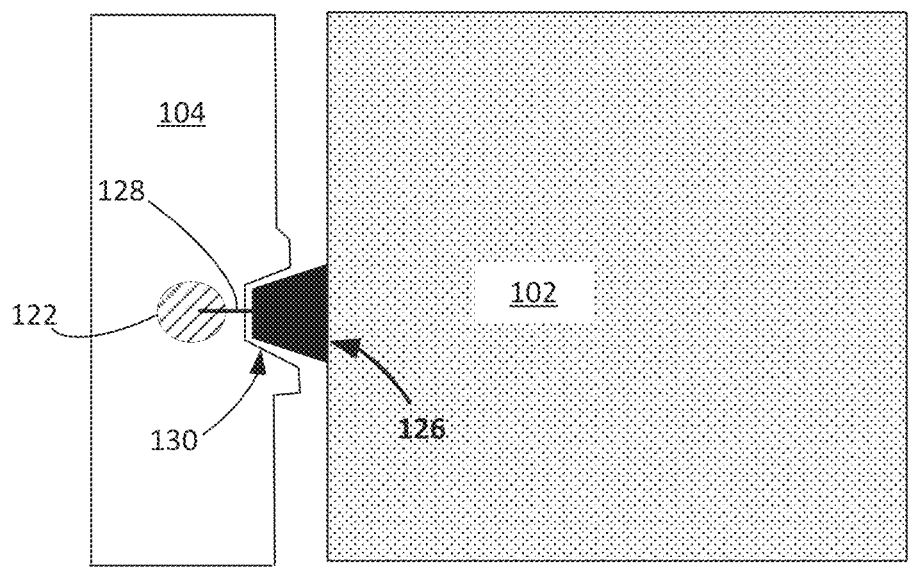
FIG. 6A depicts a close up view of the cup/cone interface.

Each satellite 102 has a nose cone 126, which forms part of the interface to the central structure 104. The central structure 104 has a number of cups, each of each is used to receive a nose cone 126. FIG. 6A depicts a close up view of the cup/cone interface. FIG. 6A depicts a cup 130 on the central structure 104. The nose cone 126 is attached to the satellite 102. The cup 130 receives the nose cone 126. A central tie-down rod 128 can be seen connecting the satellite 102 to the central structure 104.

The central structure 104 may be formed from, for example, aluminum, titanium, or graphite. In general, the central structure 104 may be formed from a light and strong material. In an embodiment, the central structure 104 is hollow. Hence, the central structure 104 could have the general shape of a hollow tube. However, the central structure 104 could also have a truss structure.

Figure 6B:
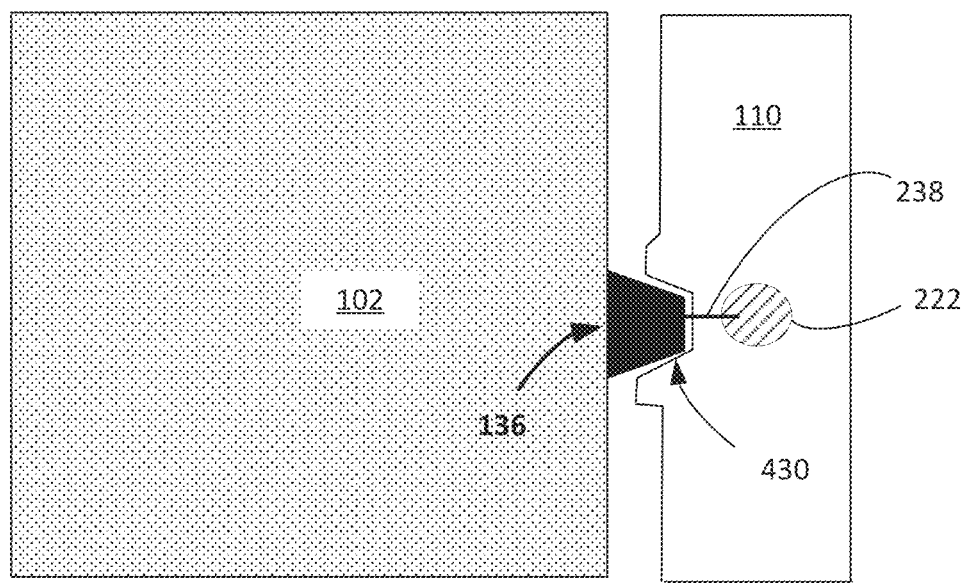
FIG. 6B depicts a close up view of the truss cup/cone interface.

Each satellite 102 has two truss cones 136, which form part of the interface to the trusses 110. In an embodiment, the trusses 110 have a number of cups 430, each of each is used to receive a truss cone 136. A spacecraft is connected to a truss by a truss tie-down rod 238. There are also a number of truss rod release mechanisms 222 attached to the trusses 110. The truss rod release mechanisms 222 are configured to release the satellites from the trusses. FIG. 6B depicts a close up view of the truss cup/cone interface. FIG. 6B depicts a cup 430 on a truss 110. The truss cone 136 is attached to the satellite 102. The cup 430 receives the truss cone 136. A truss tie-down rod 238 can be seen connecting the satellite 102 to the truss 110.

A truss tie-down release mechanism 222 (also referred to as a "truss tie-down actuator") controls the ejection of satellites 102 from a truss 110. The truss tie-down release mechanism 222 may be a low-shock release device, such that the release does not damage electronics in the satellites 102. The truss tie-down release mechanism 222 may include an electromechanical device. As one example, a truss tie-down rod 238 may be a Frangibolt® and the truss tie-down release mechanism 222 may contain one or more shape memory actuators used to break the Frangibolts®. However, the truss tie-down release mechanism 222 is not required to use either a Frangibolt® or a shape memory actuator. Together, the truss tie-down release mechanism 222 and the truss tie-down rod 238 form an embodiment of the truss tie-down mechanisms (see FIG. 2, 223).

As noted above, typically there are strong vibrations during launch. The dispensing structure 100 holds the satellites together such that the satellites do not rock and do not separate from each other during launch vibrations.

Figure 7:
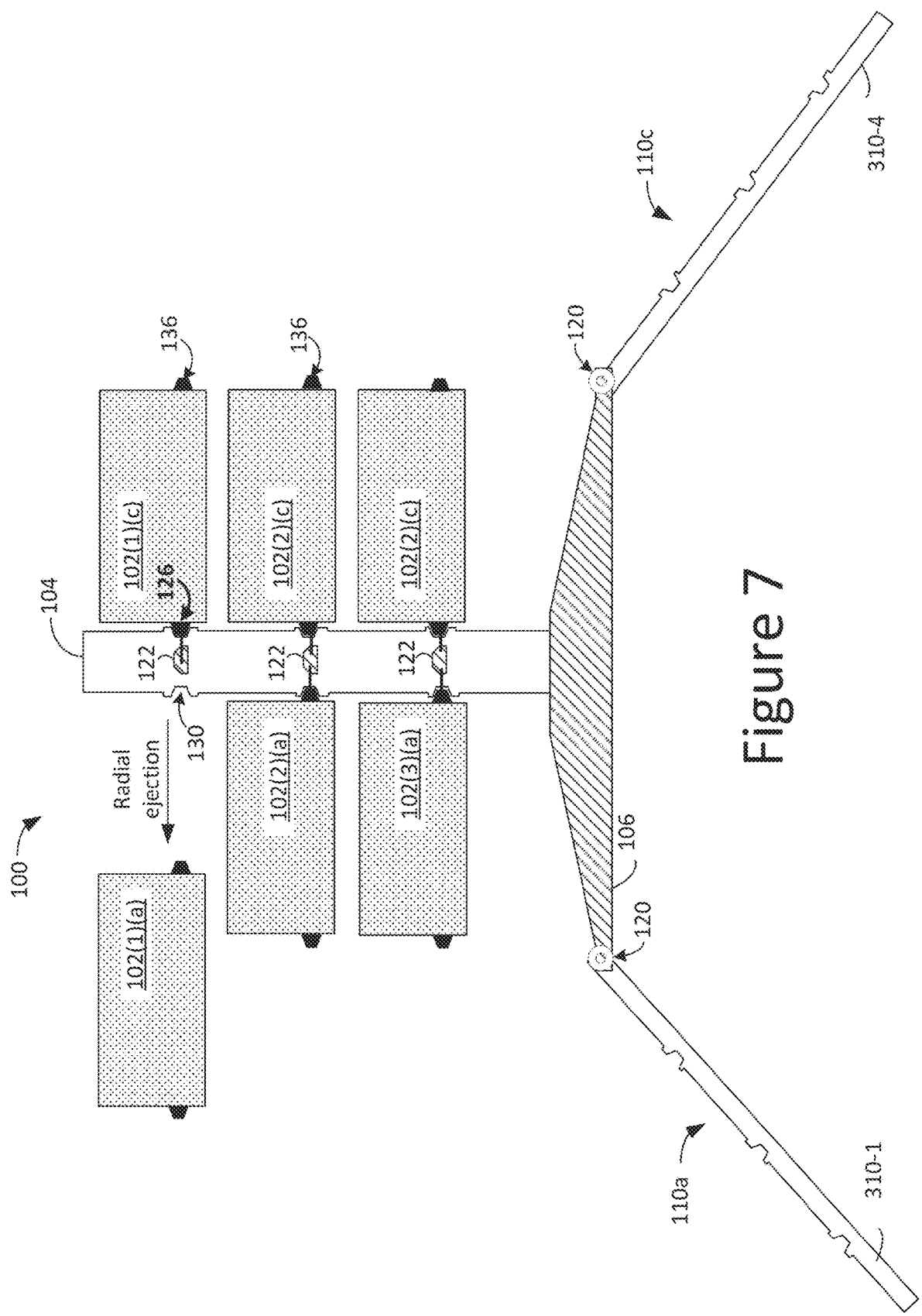
FIG. 7 depicts the dispensing structure as in FIG. 5, but in a deployment position.
Figure 8:
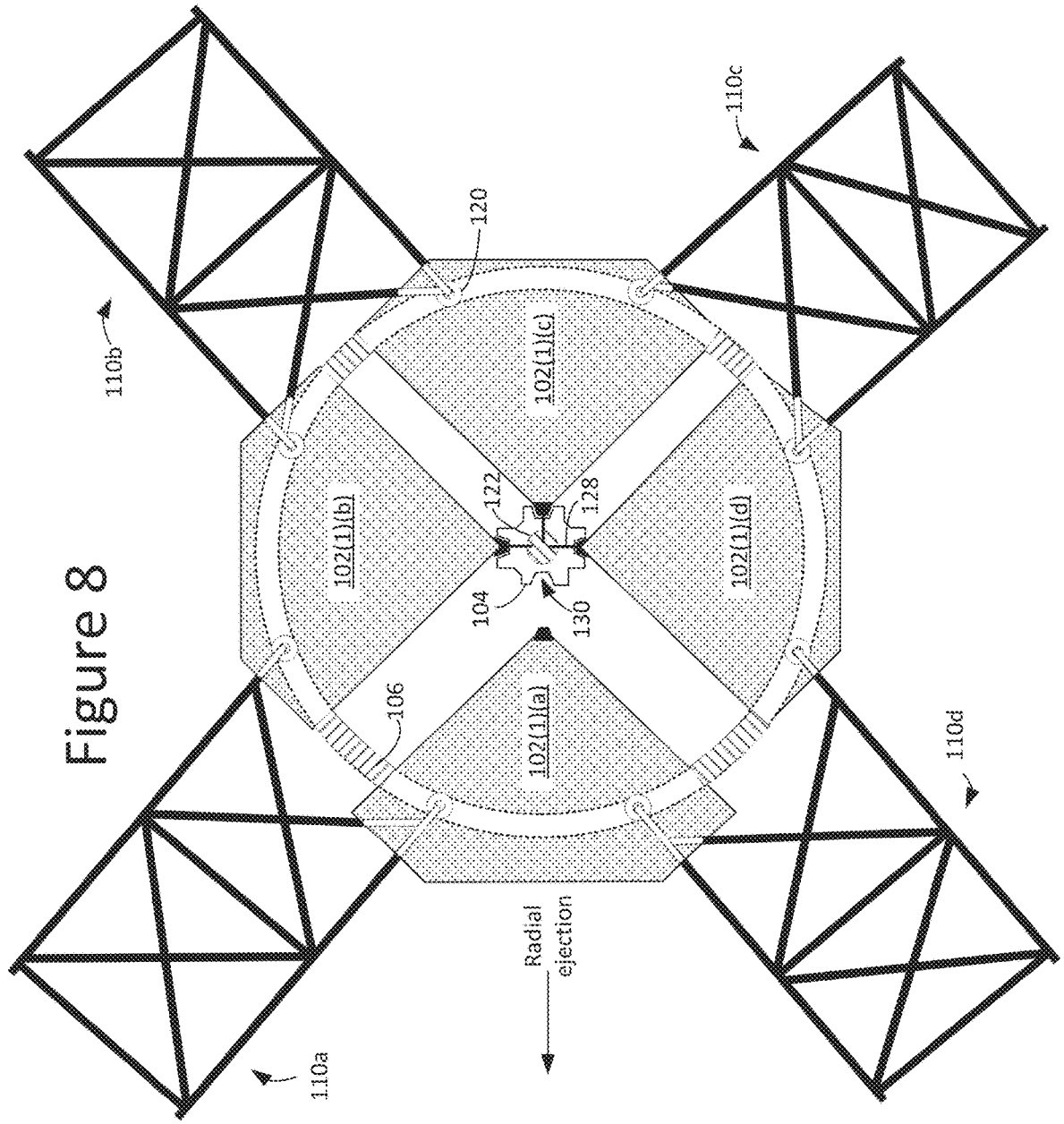
FIG. 8 depicts a top view of the structure in which all the trusses are in the deployment position.

FIG. 7 depicts the same dispensing structure 100 as in FIG. 5. However, in FIG. 7, the trusses 110 are in now in a deployment position. FIG. 7 shows a side of truss 110a, with member 310-1 visible. FIG. 7 shows a side of truss 110c, with member 310-4 visible. The other trusses are not depicted in FIG. 7, but are also in the deployment position in order to allow the ejection of the satellites. FIG. 8 depicts a top view of the dispensing structure 100 in which all four of the trusses 110a, 110b, 110c, and 110d are moved to the deployment position.

When in the deployment position, the trusses 110 are out of an ejection path to permit respective satellites in the stacks to be ejected in the radial direction. Although not depicted FIG. 7, trusses 110b and 110d will also be moved to the deployment position to permit ejection of the in the respective satellites in the stack in radial direction.

After the aforementioned trusses 110 are moved to the deployment position the central tie-downs 128 continue to hold the satellites in place. The central tie-down release mechanisms 122 control the ejection of satellites 102 in the radial direction. Hence, the satellites may be released in a desired order. For example, the satellites may be released in a top to bottom order.

In one embodiment, first all four of the trusses 110a, 110b, 110c, and 110d are moved to the deployment position. Then, the central tie-down release mechanisms 122 are controlled to eject the satellites in a desired order. In one embodiment, pairs of satellites at the opposite side of the structure are ejected simultaneously. For example, satellite 102(1)(a) and 102(1)(c) may be ejected simultaneously.

Referring to FIG. 8, the trusses 110a, 110b, 110c, and 110d are depicted as still being connected to the launch adaptor 106. Note that portions of the launch adaptor 106 and trusses 110 that are below the satellites 102 in the view in FIG. 8 are depicted with dashed lines. The four satellites 102(1)(a,b,c,d) at the top level are depicted. Satellites at other levels are not depicted in FIG. 8. Satellite 102(1)(a) is being ejected in the radial direction. Satellites 102(1)(b), 102(1)(c), and 102(1)(d) are still held to the central structure 104 by central tie-downs 128. Note that multiple satellites 102 could be ejected simultaneously. For example, in some embodiments, multiple satellites 102 at the same level are ejected simultaneously. The nose cone 126 and the truss cones 136 may stay affixed to the respective satellites after they have been radially ejected. However, the central tie-down release mechanisms 122 and the truss rod release mechanisms 222 remain attached to the dispensing structure 100 after the satellites have been deployed.

As noted above, in some embodiments, the satellites at one level are rotated 45 degrees with respect to the satellites at an adjacent level. This results in the satellites at one level each being connected to two different trusses 110, but the satellites at the rotated level each being connected to a single truss. FIG. 9 depicts a view of an embodiment of such a 45 degree rotated level. The view of FIG. 9 shows four satellites 102(2)(a), 102(2)(b), 102(2)(c), and 102(2)(d), which may reside at a second level of a group of satellites. The configuration depicted in FIG. 9 may be used in combination with the configuration depicted in FIG. 4. Typically, the configuration depicted in FIG. 9 would not be used for all levels of the satellites. Rather, by combining the configuration of FIG. 9 with the configuration of FIG. 4, excellent structural rigidity is achieved.

The satellites in FIG. 9 are rotated 45 degrees relative to the satellites in FIG. 4. The same four trusses 110a, 110b, 110c, 110d from FIG. 4 are depicted in FIG. 9. However in FIG. 9, each truss 110 connects to a single satellites 102 at the level being depicted. For example, truss 110a connects to satellite 102(2)(a), truss 110b connects to satellite 102(2)(b), truss 110c connects to satellite 102(2)(c), and truss 110d connects to satellite 102(2)(d). One option is to alternate the configuration depicted in FIG. 4 with the configuration depicted in FIG. 9 at odd and even levels. In some embodiments, the configuration depicted in FIG. 4 is used for all levels.

Figure 10:
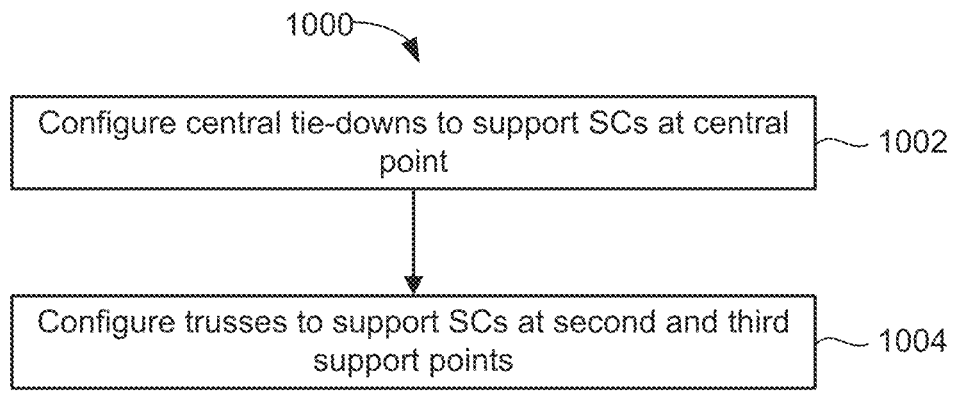
FIG. 10 is a flowchart of one embodiment of a process of configuring spacecrafts for launch.

FIG. 10 is a flowchart of one embodiment of a process 1000 of configuring spacecrafts for launch. The process will be explained with reference to the various embodiments of spacecraft launch restraint and dispensing structures 100, but is not limited to these embodiments. The steps in process 1000 may be performed in a different order than depicted and may overlap. Step 1002 includes configuring central tie-down rods 128 to hold the spacecrafts 102 to the central structure 104. Step 1002 may include pre-tensioning the central tie-down rods 128 to hold the spacecrafts 102 to the central structure 104. The central structure 104 will provide a central structural support point for each respective spacecraft 102. By a structural support point it is meant that the central structure 104 will bear the load of the spacecrafts (along with the trusses 110). In one embodiment, each central tie-down rod 128 is bolted to a spacecraft 102. In one embodiment, the central tie-down rods 128 are part of a central tie-down mechanism 121, which may be connected to the central structure 104. In an embodiment, the central structure 104 has a number of cups 130, and each spacecraft 102 has a nose cone 126, which is placed into a cup 130.

Step 1004 includes configuring trusses 110 to provide second and third support points for each satellite 102. Step 1004 includes configuring truss tie-down rods 238 to hold the spacecrafts 102 to the trusses 110. In an embodiment, each satellite is connected to two trusses. For example, a first exterior point on the satellite is connected to one truss and a second exterior point on the satellite is connected to another truss. In some embodiments, the satellites at one level are rotated 45 degrees from an adjacent level, which may result in each satellite at one level being connected to two trusses and each satellite at the rotated level being connected to a single truss. Each truss tie-down rod 238 may be part of a truss tie-down mechanism 223, which is connected to a truss 110. Step 1004 may include pre-tensioning the truss tie-down rods 238 to hold the spacecrafts 102 to the trusses 110. Process 1000 may further include securing the dispensing structure 100 to a launch adaptor 106. Both the central structure 104 and the trusses 110 may be attached to the launch adaptor 106.

Figure 11:
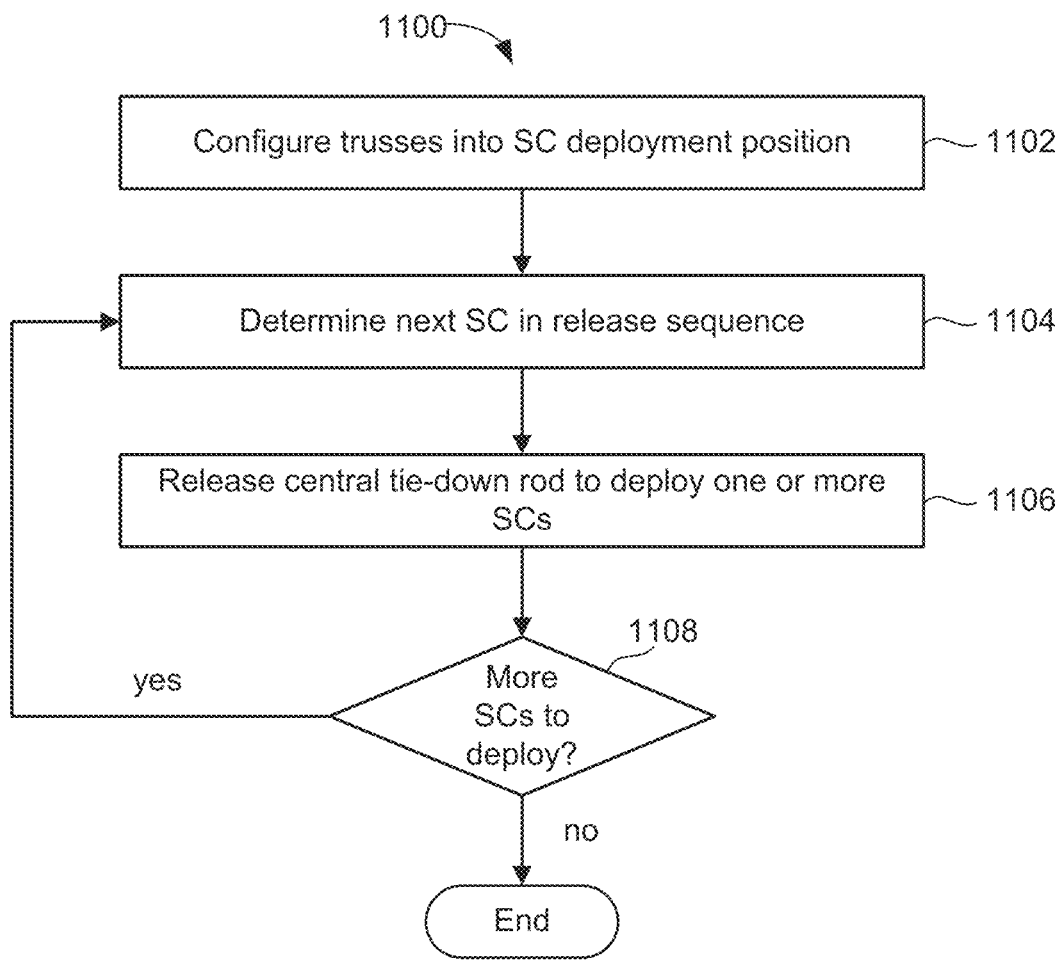
FIG. 11 is a flowchart of one embodiment of a process of dispensing spacecrafts into orbit.

FIG. 11 is a flowchart of one embodiment of a process 1100 of dispensing spacecrafts 102 into orbit. The process will be explained with reference to the various embodiments of spacecraft launch restraint and dispensing structures 110, but is not limited to these embodiments. The steps in process 1100 may be performed in a different order than depicted and/or may overlap. In some embodiments, process 1100 is performed under control of a micro-processor in the spacecraft 102. Process 1000 may be performed prior to process 1100. The trusses 110 are in the support position prior to process 1100. Process 1100 may be performed by a controller (e.g., micro-processor).

Step 1102 includes configuring trusses 110 from the support position into the deployment position. In one embodiment, all of the trusses 110 are swung out simultaneously into the deployment position. FIGS. 7 and 8 depict an example in which trusses 110 are in the spacecraft deployment position. Step 1102 may include positioning all of the trusses 110 in the spacecraft deployment position.

In one embodiment, step 1102 includes issuing control signals to the truss tie-down release mechanisms 222 when a spacecrafts 102 are connected to the trusses 110 and when the plurality spacecrafts are connected to a central structure in order to release the spacecrafts 102 from the trusses 110 while the spacecrafts remain attached to the central structure 104. In an embodiment, the trusses 110 are caused to move from the support position to the deployment position as a result of issuing the control signals to the truss tie-down release mechanisms 222 to release the spacecrafts 102 from the trusses 110. Step 1102 may include releasing each spacecraft in at least one of the levels from two of the trusses 110. For example, with respect to FIG. 8, each satellite 102 is released from two of the trusses 110.

Step 1104 includes determining a next spacecraft to release. In general, the spacecrafts can be released in any desired sequence. However, practical considerations may impact the sequence. In some cases, spacecrafts that are further from the launch adaptor 106 are deployed first.

Step 1106 includes operating a central tie-down release mechanism 122 to dispense one or more spacecrafts. Step 1106 may include issuing control signals to central tie-down release mechanisms 122 to radially release the spacecrafts 102 from the central structure 104 in accordance with a release sequence when the trusses 110 are in the deployment position. FIGS. 7 and 8 depict satellite 102(1)(a) being dispensed (or ejected). The satellite 102 is ejected in the radial direction. In this example, one satellites is ejected. In some embodiments, multiple satellites are deployed simultaneously. Step 1108 is a determination of whether there are more spacecrafts to deploy. If so, steps 1104 and 1106 are performed again. After the spacecrafts are deployed ground control may take over the maneuvering of the satellites to place each respective satellite into the desired orbit.

Figure 12:
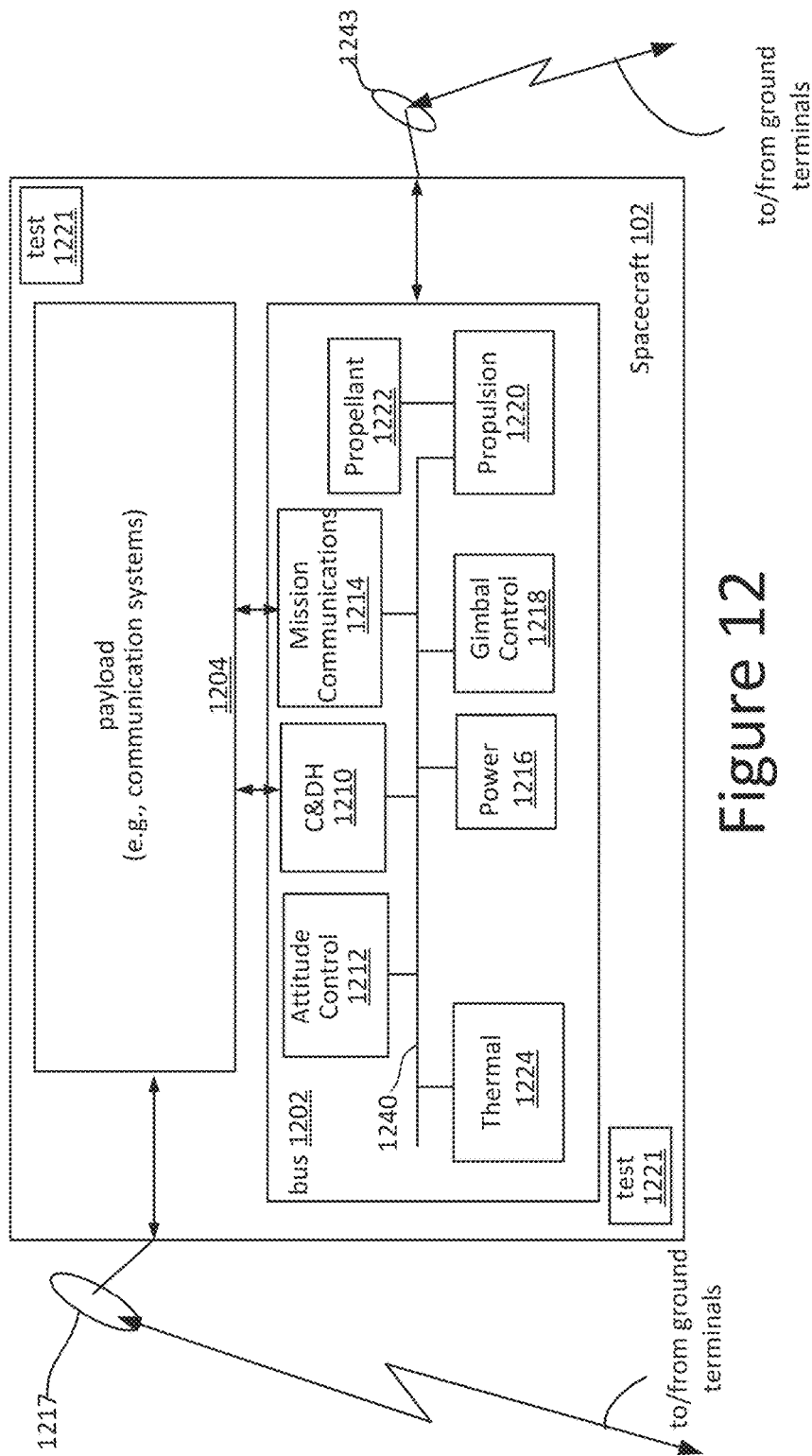
FIG. 12 is a block diagram of an example spacecraft.

FIG. 12 is a block diagram of one embodiment of spacecraft 102, which in one example (as discussed above) is a satellite. In one embodiment, spacecraft 102 includes a bus 1202 and a payload 1204 carried by bus 1202. Some embodiments of spacecraft 102 may include more than one payload. The payload provides the functionality of communication, sensors and/or processing systems needed for the mission of spacecraft 102.

In general, bus 1202 is the spacecraft that houses and carries the payload 1204, such as the components for operation as a communication satellite. The bus 1202 includes a number of different functional sub-systems or modules, some examples of which are shown. Each of the functional sub-systems typically include electrical systems, as well as mechanical components (e.g., servos, actuators) controlled by the electrical systems. These include a command and data handling sub-system (C&DH) 1210, attitude control systems 1212, mission communication systems 1214, power subsystems 1216, gimbal control electronics 1218 that be taken to include a solar array drive assembly, a propulsion system 1220 (e.g., thrusters), propellant 1222 to fuel some embodiments of propulsion system 1220, and thermal control subsystem 1224, all of which are connected by an internal communication network 1240, which can be an electrical bus (a "flight harness") or other means for electronic, optical or RF communication when spacecraft is in operation. Also represented are an antenna 1243, that is one of one or more antennae used by the mission communication systems 1214 for exchanging communications for operating of the spacecraft with ground terminals, and a payload antenna 1217, that is one of one or more antennae used by the payload 1204 for exchanging communications with ground terminals, such as the antennae used by a communication satellite embodiment. The spacecraft can also include a number of test sensors 1221, such as accelerometers that can used when performing test operations on the spacecraft. Other equipment can also be included.

The command and data handling module 1210 includes any processing unit or units for handling includes command control functions for spacecraft 102, such as for attitude control functionality and orbit control functionality. The attitude control systems 1212 can include devices including torque rods, wheel drive electronics, and control momentum gyro control electronics, for example, that are used to monitor and control the attitude of the space craft. Mission communication systems 1214 includes wireless communication and processing equipment for receiving telemetry data/commands, other commands from the ground control terminal 30 to the spacecraft and ranging to operate the spacecraft. Processing capability within the command and data handling module 1210 is used to control and operate spacecraft 102. An operator on the ground can control spacecraft 102 by sending commands via ground control terminal 30 to mission communication systems 1214 to be executed by processors within command and data handling module 1210. In one embodiment, command and data handling module 1210 and mission communication system 1214 are in communication with payload 1204. In some example implementations, bus 1202 includes one or more antennae as indicated at 1243 connected to mission communication system 1214 for wirelessly communicating between ground control terminal 30 and mission communication system 1214. Power subsystems 1216 can include one or more solar panels and charge storage (e.g., one or more batteries) used to provide power to spacecraft 102. Propulsion system 1220 (e.g., thrusters) is used for changing the position or orientation of spacecraft 102 while in space to move into orbit, to change orbit or to move to a different location in space. The gimbal control electronics 1218 can be used to move and align the antennae, solar panels, and other external extensions of the spacecraft 102.

In one embodiment, the payload 1204 is for a communication satellite and includes an antenna system (represented by the antenna 1217) that provides a set of one or more beams (e.g., spot beams) comprising a beam pattern used to receive wireless signals from ground stations and/or other spacecraft, and to send wireless signals to ground stations and/or other spacecraft. In some implementations, mission communication system 1214 acts as an interface that uses the antennae of payload 1204 to wirelessly communicate with ground control terminal 30. In other embodiments, the payload could alternately or additionally include an optical payload, such as one or more telescopes or imaging systems along with their control systems, which can also include RF communications to provide uplink/downlink capabilities.

Figure 13:
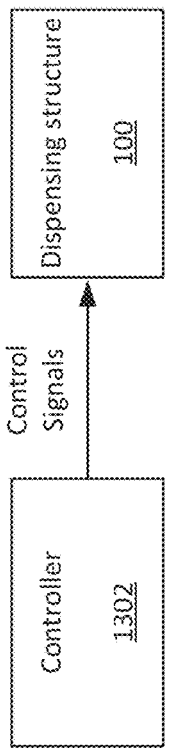
FIG. 13 depicts one embodiment of a system for dispensing spacecrafts.

FIG. 13 depicts one embodiment of a system for dispensing spacecrafts. The system 1300 may be referred to herein as an apparatus. The system 1300 includes a spacecraft launch restraint and dispensing structure 100 and a controller 1302. The controller 1302 issues control signals to the dispensing structure 100 to control operation of the dispensing structure 100. The control signals may be transmitted wirelessly, by wireline, or by a combination of wirelessly and wireline. In an embodiment, the controller 1302 issues control signals to the dispensing structure 100 to implement process 1100.

The controller 1302 may reside in the launch vehicle, in ground control 30, or in a combination of the launch vehicle and ground control 30. The controller 1302 may comprise hardware and/or software. The controller 1302 could include one or more of a processor (e.g., micro-processor), PGA (Programmable Gate Array), FPGA (Field Programmable Gate Array), ASIC (Application Specific Integrated Circuit), integrated circuit or other type of circuit.

A first embodiment includes an apparatus comprising a central structure configured to connect to a launch adaptor. The apparatus comprises a plurality of central tie-down mechanisms connected to the central structure. Each central tie-down mechanism is configured to hold a spacecraft radially to the central structure. A plurality of spacecrafts are grouped around the central structure in multiple levels of spacecrafts. The apparatus comprises a plurality of trusses configured to connect to the launch adaptor. The plurality of trusses surround the plurality of spacecrafts. Each truss has a first position configured support a set of the spacecrafts and a second position in which the truss extends away from the set of the spacecrafts to allow radial ejection of the set of the spacecrafts. The apparatus comprises a plurality of truss tie-down mechanisms. Each truss tie-down mechanism is connected to a truss and configured to tie-down a spacecraft to the truss. Each spacecraft is tied to one or more trusses. The spacecrafts in at least one of the levels are each tied to two of the trusses. Each central tie-down mechanism is configured to hold a spacecraft to the central structure both when the trusses are in the first position and the second position.

In a second embodiment, in furtherance of the first embodiment, each respective truss tie-down mechanism is configured to release, in response to a control signal, a respective spacecraft from the truss to which the respective truss tie-down mechanism is connected while the spacecrafts remain connected to the central structure.

In a third embodiment, in furtherance of the first or second embodiment, the plurality of trusses are connected to hinges that enable the plurality of trusses to move from the first position to the second position after the spacecrafts are released from the trusses.

In a fourth embodiment, in furtherance of any of the first to third embodiments each respective central tie-down mechanism is configured to release, in response to a control signal, one or more of the spacecrafts from the central structure when the trusses are in the second position.

In a fifth embodiment, in furtherance of any of the first to fourth embodiments, the apparatus further comprises a controller that is configured to issue control signals to control a sequence of ejecting the spacecrafts from the central structure.

In a sixth embodiment, in furtherance of any of the first to fifth embodiments, the central structure comprises a plurality of cups, each cup is configured to receive a cone of respective spacecraft to hold the respective spacecraft in place.

In a seventh embodiment, in furtherance of any of the first to sixth embodiments, the plurality of trusses and the central structure are configured to carry weight of the spacecrafts during launch.

In an eighth embodiment, in furtherance of any of the first to seventh embodiments, the spacecrafts in at least one of the levels are each tied to a different one of the trusses.

In a ninth embodiment, in furtherance of any of the first to eighth embodiments, the central structure comprises a truss structure.

In a tenth embodiment, in furtherance of any of the first to eighth embodiments, the central structure comprises a hollow post.

In an eleventh embodiment, in furtherance of any of the first to tenth embodiments, the plurality of trusses are planar trusses each comprising two members and a plurality of nodes.

One embodiment includes a method of dispensing spacecrafts. The method comprises issuing control signals to a plurality of truss tie-down release mechanisms when a plurality spacecrafts are connected to the trusses and when the plurality spacecrafts are radially connected to a central structure in order to release the spacecrafts from the trusses while the spacecrafts remain radially connected to the central structure, including releasing each spacecraft in at least one of the levels from two of the trusses. The method comprises causing the trusses to move from a support position in which the trusses are connected to a launch adaptor and surround and support the spacecrafts to a deployment position in which the trusses remain connected to the launch adaptor but no longer support or surround the spacecrafts such that an ejection path for the spacecrafts is available. The method comprises issuing control signals to a plurality of central tie-down release mechanisms to radially release the spacecrafts from the central structure in accordance with a release sequence when the trusses are in the deployment position.

One embodiment includes a satellite launch and dispensing system. The system comprise a central structure, and a plurality of satellites grouped around the central structure. The plurality of satellites comprise multiple levels of satellites with each level having at least two satellites. The system comprises a plurality of central tie-down mechanisms connected to the central structure, each central tie-down mechanism having a central tie-down rod configured to hold an interior point of a spacecraft radially to the central structure. The system comprises a plurality of trusses. The trusses have a first position in which the trusses support each satellite at two exterior points on the respective satellite and a second position in which the trusses extend away from the satellites to allow ejection of the satellites. The system comprises a plurality of truss tie-down mechanisms. Each truss tie-down mechanisms is connected to a truss and has a truss tie-down rod configured to tie-down an exterior point on a spacecraft to the respective truss. Each satellite is supported at two exterior points by one or more trusses and at an interior point by the central structure. Each satellite in at least one of the levels is supported at the two exterior points by two different trusses.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. An apparatus comprising:
   a central structure configured to connect to a launch adaptor;
   a plurality of central tie-down mechanisms connected to the central structure, each central tie-down mechanism configured to hold a spacecraft radially to the central structure, wherein a plurality of spacecrafts are grouped around the central structure in multiple levels of spacecrafts, with at least two spacecrafts at each level;
   a plurality of trusses configured to connect to the launch adaptor, wherein the plurality of trusses surround the plurality of spacecrafts, each truss having a first position configured to connect to and support at least one of the spacecrafts in each level, wherein for at least one level of the multiple levels in the first position each truss connects to two adjacent spacecrafts in the at least one level, wherein the trusses have a second position in which the trusses extends away from the plurality of the spacecrafts to allow radial ejection of the plurality of the spacecrafts; and
   a plurality of truss tie-down mechanisms, each truss tie-down mechanism connected to a truss and configured to tie-down a spacecraft to the truss, wherein each spacecraft is tied to one or more of the trusses, wherein the spacecrafts in the at least one level are each tied to two of the trusses, wherein each central tie-down mechanism is configured to hold a spacecraft to the central structure both when the trusses are in the first position and the second position.

2. The apparatus of claim 1, wherein each respective truss tie-down mechanism is configured to release, in response to a control signal, a respective spacecraft from the truss to which the respective truss tie-down mechanism is connected while the spacecrafts remain connected to the central structure.

3. The apparatus of claim 2, wherein the plurality of trusses are connected to hinges that enable the plurality of trusses to move from the first position to the second position after the spacecrafts are released from the trusses.

4. The apparatus of claim 2, wherein each respective central tie-down mechanism is configured to release, in response to a control signal, one or more of the spacecrafts from the central structure when the trusses are in the second position.

5. The apparatus of claim 1, further comprising a controller that is configured to issue control signals to control a sequence of ejecting the spacecrafts from the central structure.

6. The apparatus of claim 1, wherein:
   the central structure comprises a plurality of cups, each cup is configured to receive a cone of respective spacecraft to hold the respective spacecraft in place.

7. The apparatus of claim 1, wherein:
the plurality of trusses and the central structure are configured to carry weight of the spacecrafts during launch.

8. The apparatus of claim 1, wherein:
the spacecrafts in at least one of the levels are each tied to a different one of the trusses.

9. The apparatus of claim 1, wherein the central structure comprises a truss structure.

10. The apparatus of claim 1, wherein the central structure comprises a hollow post.

11. The apparatus of claim 1, wherein the plurality of trusses are planar trusses each comprising two members and a plurality of nodes.

12. A method of dispensing spacecrafts, the method comprising:
issuing control signals to a plurality of truss tie-down release mechanisms when a plurality spacecrafts are connected to trusses and when the plurality spacecrafts are radially connected to a central structure in different levels in order to release the spacecrafts from the trusses while the spacecrafts remain radially connected to the central structure, including releasing each spacecraft in at least one level of the levels from two of the trusses, including releasing each truss from two adjacent spacecrafts in the at least one level;
causing the trusses to move from a support position in which the trusses are connected to a launch adaptor and surround and support the spacecrafts to a deployment position in which the trusses remain connected to the launch adaptor but no longer support or surround the spacecrafts such that an ejection path for the spacecrafts is available; and
issuing control signals to a plurality of central tie-down release mechanisms to radially release the spacecrafts from the central structure in accordance with a release sequence when the trusses are in the deployment position.

13. The method of claim 12, wherein issuing the control signals to the plurality of central tie-down release mechanisms to radially release the spacecrafts from the central structure in accordance with the release sequence when the trusses are in the deployment position comprises:
actuating a central tie-down release mechanism to simultaneously eject two of the spacecrafts.

14. The method of claim 12, wherein causing the trusses to move from the support position to the deployment position results from issuing the control signals to the plurality of truss tie-down release mechanisms when the plurality spacecrafts are radially connected to the trusses to release the spacecrafts from the trusses.

15. A satellite launch and dispensing system, the system comprising:
a central structure;
a plurality of satellites grouped around the central structure, wherein the plurality of satellites comprise multiple levels of satellites with each level having at least two satellites;
plurality of central tie-down mechanisms connected to the central structure, each central tie-down mechanism having a central tie-down rod configured to hold an interior point of a satellite radially to the central structure;
a plurality of trusses, wherein the trusses have a first position in which the trusses support each satellite at two exterior points on the respective satellite and a second position in which the trusses extend away from the satellites to allow ejection of the satellites, wherein for at least one level of the satellites in the first position each truss connects to two adjacent satellites in the at least one level; and
a plurality of truss tie-down mechanisms, each truss tie-down mechanisms connected to a truss and having a truss tie-down rod configured to tie-down an exterior point on a spacecraft to the respective truss, wherein each satellite is supported at two exterior points by one or more trusses and at an interior point by the central structure, wherein each satellite in the at least one level is supported at the two exterior points by two different trusses.

16. The satellite launch and dispensing system of claim 15, wherein the plurality of truss tie-down mechanisms each have a truss tie-down actuator associated with a truss tie-down rod, each truss tie-down actuator configured to release the associated truss tie-down rod in order to release a spacecraft from the respective truss, and further comprising:
a controller in communication with the truss tie-down actuators, the controller configured to issue control signals to the truss tie-down actuators to release the spacecrafts from the trusses while the spacecrafts remain connected to the central structure.

17. The satellite launch and dispensing system of claim 15, wherein:
the plurality of truss tie-down mechanisms each have a central tie-down actuator configured to release at least one central tie-down rod in order to radially release one or more spacecrafts from the central structure when the trusses are in the second position and further comprising:
a controller in communication with the central tie-down actuators, the controller configured to issue control signals to the central tie-down actuators to release the spacecrafts from the central structure when the trusses are in the second position.

18. The satellite launch and dispensing system of claim 15, further comprising a launch adaptor configured to connect to a launch vehicle, wherein the central structure is connected to the launch adaptor, wherein the trusses are connected to the launch adaptor.

19. The satellite launch and dispensing system of claim 15, wherein each satellite in at least one of the levels is supported at the two exterior points by a single truss.

20. The satellite launch and dispensing system of claim 15, wherein each satellite in all of the levels is supported at the two exterior points by two different trusses.

* * * * *

UNITED STATES PATENT AND TRADEMARK OFFICE
CERTIFICATE OF CORRECTION

| | | |
|---|---|---|
| PATENT NO. | : 11,649,075 B2 | |
| APPLICATION NO. | : 17/410702 | |
| DATED | : May 16, 2023 | |
| INVENTOR(S) | : V. Baghdasarian | |

It is certified that error appears in the above-identified patent and that said Letters Patent is hereby corrected as shown below:

In the Claims

Column 15, Line 20 Claim 12, change "plurality spacecrafts" to -- plurality of spacecrafts --

Column 15, Lines 50-51 Claim 14, change "plurality spacecrafts" to -- plurality of spacecrafts --

Column 16, Line 1 Claim 15, change "plurality" to -- a plurality --

Signed and Sealed this
Tenth Day of October, 2023

*Katherine Kelly Vidal*

Katherine Kelly Vidal
*Director of the United States Patent and Trademark Office*